US009631685B2

(12) United States Patent
Sakai et al.

(10) Patent No.: US 9,631,685 B2
(45) Date of Patent: Apr. 25, 2017

(54) ELECTRIC ACTUATOR AND VEHICLE BRAKE SYSTEM

(71) Applicant: NISSIN KOGYO CO., LTD., Ueda, Nagano (JP)

(72) Inventors: Kouji Sakai, Nagano (JP); Nobuyuki Kobayashi, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 7 days.

(21) Appl. No.: 14/547,842

(22) Filed: Nov. 19, 2014

(65) Prior Publication Data

US 2015/0204401 A1    Jul. 23, 2015

(30) Foreign Application Priority Data

Jan. 17, 2014   (JP) .................................. 2014-006953

(51) Int. Cl.
*F16D 65/14* (2006.01)
*H02K 7/06* (2006.01)
(Continued)

(52) U.S. Cl.
CPC ............ *F16D 65/14* (2013.01); *B60T 8/4081* (2013.01); *B60T 13/662* (2013.01); *B60T 13/745* (2013.01);
(Continued)

(58) Field of Classification Search
CPC ...... B60T 13/745; B60T 13/142; B60T 11/16; B60T 11/165; B60T 11/224
(Continued)

(56) References Cited

U.S. PATENT DOCUMENTS 1,375,889 A * 4/1921 Baltzley ................ B65H 20/18
226/149
4,828,334 A    5/1989 Salman
(Continued)

FOREIGN PATENT DOCUMENTS

EP   2641796    9/2013
JP   H07310800  11/1995
(Continued)

OTHER PUBLICATIONS

European Search Report for related EP Application No. 14196762.0-1756, dated Jun. 5, 2015, 6 pages.
(Continued)

*Primary Examiner* — Robert A Siconolfi
*Assistant Examiner* — San Aung
(74) *Attorney, Agent, or Firm* — Andrew M. Calderon; Roberts Mlotkowski Safran Cole & Calderon, P.C.

(57) ABSTRACT

An electric actuator includes a shaft member, a nut member, a power transmission member, and a guide portion. A spiral groove is formed on an outer circumference of the shaft member. The nut member is fitted onto the shaft member. A power transmission member is disposed between an inner circumference of the nut member and the groove. The guide portion is configured to guide linear motion of the shaft member. Rotation of the nut member about the shaft member by means of a rotational driving force of an electric motor results in the linear motion of the shaft member. The guide portion includes a rotating mechanism portion configured to rotate the shaft member about an axis when the shaft member is in the linear motion.

18 Claims, 5 Drawing Sheets

(51) Int. Cl.
*B60T 13/66* (2006.01)
*B60T 13/74* (2006.01)
*B60T 8/40* (2006.01)
*F16D 121/18* (2012.01)
*F16D 125/40* (2012.01)

(52) U.S. Cl.
CPC .......... *H02K 7/06* (2013.01); *F16D 2121/18* (2013.01); *F16D 2125/40* (2013.01)

(58) Field of Classification Search
USPC .............. 188/106 F; 303/3, 15, 20; 60/545
See application file for complete search history.

(56) References Cited

U.S. PATENT DOCUMENTS 5,667,283 A * 9/1997 Drennen .................. B60T 8/00
　　　　　　　　　　　　　　　　　　　　　303/115.2

2014/0026557 A1 * 1/2014 Ohnishi ................ B60T 8/4081
　　　　　　　　　　　　　　　　　　　　　60/545

FOREIGN PATENT DOCUMENTS

| JP | 2002213505 | 7/2002 |
| JP | 2009208612 | 9/2009 |
| JP | 2012210879 | 11/2012 |
| JP | 2012214118 A | 11/2012 |
| JP | 2013148108 | 8/2013 |
| WO | WO-2012133456 | 10/2012 |
| WO | WO-2013077366 | 5/2013 |
| WO | WO-2013147251 | 10/2013 |

OTHER PUBLICATIONS

Japanese Office Action for Related Application No. JP2014-006953, dated Dec. 1, 2015, 11 pages.

* cited by examiner

ELECTRIC ACTUATOR AND VEHICLE BRAKE SYSTEM

CROSS REFERENCE TO RELATED APPLICATION

This application is based on and claims priority under 35 U.S.C. §119 to Japanese Patent Application No. 2014-006953 (filed on Jan. 17, 2014), the entire contents of which are incorporated herein by reference.

BACKGROUND

1. Field

Exemplary embodiments of the invention relate to an electric actuator and a vehicle brake system including the electric actuator.

2. Related Art

An electric brake system (a vehicle brake system) described in JP 2012-214118 A includes a motor cylinder device (a hydraulic pressure generator) that generates a brake hydraulic pressure by means of a driving force of an electric motor. This motor cylinder device is configured to generate a brake hydraulic pressure by translating rotational drive of the electric motor into a linear motion of a slave piston by a ball screw structure (an electric actuator) to thereby compress a brake fluid by the slave piston.

SUMMARY

In the ball screw structure described in JP 2012-214118 A, a rotational driving force output by the electric motor causes linear motion of a ball screw shaft (a shaft member). Also, in the motor cylinder device, the ball screw shaft that is in linear motion displaces the slave piston to thereby generate a brake hydraulic pressure. Consequently, a speed at which the ball screw shaft is in linear motion is low, for example, until the electric motor reaches a predetermined rotational speed after it has been started (at an initial stage of motor starting), which slows a speed at which the slave piston is displaced. Therefore, a brake hydraulic pressure is not generated quickly in the motor cylinder device, which slows rising of a brake hydraulic pressure generated in the motor cylinder device.

In order to make the brake hydraulic pressure rise quickly in the motor cylinder device, an electric motor with a large output may be used or a gear ratio at which a rotational driving force output by the electric motor is transmitted to the ball screw structure may be increased. However, these measures would greatly increase a cost of a product.

Then, an object of one exemplary embodiment of the invention is to provide a vehicle brake system and an electric actuator that can suppress a brake hydraulic pressure from slowly rising.

(1) According to one exemplary embodiment, an electric actuator includes a shaft member, a nut member, a power transmission member, and a guide portion. A spiral groove is formed on an outer circumference of the shaft member. The nut member is fitted onto the shaft member. A power transmission member is disposed between an inner circumference of the nut member and the groove. The guide portion is configured to guide linear motion of the shaft member. Rotation of the nut member about the shaft member by means of a rotational driving force of an electric motor results in the linear motion of the shaft member. The guide portion includes a rotating mechanism portion configured to rotate the shaft member about an axis when the shaft member is in the linear motion.

With this configuration, the shaft member that advances straight by means of the rotation of the nut member can be caused to be in the linear motion while being rotated about the axis. Therefore, the relative rotating speed of the nut member to the rotating speed of the shaft member is changeable, thereby making it possible to obtain an effect that is equivalent to an effect that would be obtained by changing the gear ratio at which the rotational driving force of the nut member is transmitted to the shaft member (a ratio of the rotation of the nut member to the rotation of the shaft member). Thereby, an effect equivalent to an effect that would be obtained by changing the gear ratio at which the rotational driving force output by the electric motor is transmitted to the shaft member. Also, the gear ratio between the electric motor and the shaft member can be changed without accompanying a change in mechanism that transmits the rotational driving force output by the electric motor to the nut member. Thereby, the gear ratio at which the rotational driving force output by the electric motor is transmitted to the shaft member can be changed, which realizes the configuration that can change the gear ratio without involving a large increase in production cost.

(2) In the electric actuator of (1), a protrusion portion may protrude from an outer circumference of the shaft member. The guide portion may be provided with a guide groove configured to be brought into engagement with the protrusion portion so as to guide the linear motion of the shaft member. The guide groove may constitute the rotating mechanism portion. The rotating mechanism portion may include an inclination portion that is inclined with respect to the direction of the axis.

With this configuration, the shaft member which is in the linear motion can be rotated around the axis only by forming the guide groove having the inclined portion that is inclined with respect to the direction of the axis in the guide portion that guides the linear motion of the shaft member.

(3) In the electric actuator of any one of (1) to (2), the power transmission member may include a ball configured to roll in the groove as the nut member rotates.

With this configuration, the electric actuator can be made be the ball screw structure that transmits the rotational driving force of the nut member to the shaft member with the ball.

(4) In the electric actuator of any one of (1) to (3), the guide portion may be formed as a separate member from a base body that houses the shaft member.

With this configuration, since the guide portion can be manufactured and worked alone, the productivity and workability are improved. The characteristics of the electric actuator such as the ratio of rotation to the linear motion of the shaft member can easily be changed by replacing the guide portion with other guide portions.

(5) In the electric actuator of any one of (1) to (4), the guide portion may include a reverse rotating portion configured to rotate the shaft member, which is in the linear motion, in an opposite direction to a rotation direction of the nut member.

With this configuration, the reverse rotating portion is provided in the guide portion that rotates the shaft member in the reverse direction to the rotational direction of the nut member. The rotating speed of the nut member can be increased relatively by the reverse rotating portion, to thereby make it possible to increase the displacement speed of the shaft member.

(6) In the electric actuator of any one of (1) to (5), the guide portion may include a forward rotating portion configured to rotate the shaft member, which is in the linear motion, in the same direction as the rotation direction of the nut member.

With this configuration, the forward rotating portion is provided in the guide portion that rotates the shaft member in the same direction as the rotational direction of the nut member. The rotating speed of the nut member can be reduced relatively by the forward rotating portion. This can obtain an effect equivalent to an effect that would be obtained by increasing the gear ratio between the nut member and the shaft member. This can, in turn, obtain an effect equivalent to an effect that would be obtained by increasing the gear ratio at which the rotational driving force output by the electric motor is transmitted to the shaft member. Thus, it is possible to increase the propelling force when the shaft member is displaced by means of the rotational driving force output by the electric motor.

(7) In the electric actuator of any one of (5) to (6), the guide portion may have a straight-line portion that configured to cause the shaft member to be in the linear motion without any rotation.

With this configuration, an area can be provided where the shaft member advances straight without any rotation. Since the rotational motion of the nut member can be translated into the linear motion of the shaft member with good efficiency in the event that the shaft member does not rotate, the shaft member can be displaced with good efficiency.

(8) A vehicle brake system includes a hydraulic pressure generator including the electric actuator of any one of (1) to (7). The hydraulic pressure generator may be configured to generate a brake hydraulic pressure by driving the electric motor according to an operation amount of a brake controller so as to displace the shaft member and compressing a brake fluid by means of a slave piston that is displaced within a cylinder main body as the shaft member is displaced.

With this configuration, the vehicle brake system can be provided in which the brake hydraulic pressure can also be generated by the electric actuator. The electric actuator includes the shaft member that generates the brake hydraulic pressure. This shaft member is caused to be in the linear motion, by the nut member that rotates by means of the rotational driving force output by the electric motor. The shaft member is in the linear motion while rotating itself and changes as required the relative rotating speed of the nut member to the shaft member. By changing the relative rotating speed, an effect can be obtained that is equivalent to an effect that would be obtained by changing the gear ratio at which the rotational driving force output by the electric motor is transmitted to the shaft member. Then, the speed at which the shaft member advances straight can be increased by reducing the gear ratio between the electric motor and the shaft member. Thereby, the displacement speed at which the slave piston of the hydraulic pressure generator is displaced within the cylinder main body can be increased, whereby the delay in rising of the brake hydraulic pressure can be restricted.

(9) In the vehicle brake system of (8), a displacement speed of the slave piston relative to a rotating speed of the nut member may be changeable.

With this configuration, the displacement speed of the slave piston can be changed without changing the rotating speed of the nut member. That is, even if the nut member is configured so as to rotate at the constant rotating speed, the displacement speed of the slave piston can easily be changed.

(10) In the vehicle brake system of (9), the guide portion may be formed to rotate the shaft member in an opposite direction to a rotation direction of the nut member when the electric motor is started in such a state that no brake hydraulic pressure is generated in the hydraulic pressure generator, and thereafter to rotate the shaft member in the same direction as the rotation direction of the nut member when the shaft member is displaced further.

With this configuration, when the electric motor is started in such a state that no brake hydraulic pressure is generated in the hydraulic pressure generator, the shaft member rotates in the reverse direction to the direction in which the nut member rotates. Consequently, the relative speed of the nut member to the shaft member is increased, and therefore, the displacement speed of the shaft member can be increased, whereby the displacement speed of the slave piston can be increased. This enables the hydraulic pressure generator to allow the brake hydraulic pressure to rise quickly. Also, the shaft member is allowed to be in the linear motion without any rotation after the state in which the shaft member rotates in the reverse direction to the direction in which the nut member rotates. If the shaft member does not rotate, the rotating motion of the nut member can be translated into the linear motion of the shaft member with good efficiency. Then, the shaft member rotates in the same direction as the direction in which the nut member rotates when the shaft member is displaced further. Consequently, an effect can be obtained that is equivalent to an effect that would be obtained by increasing the gear ratio at which the rotational driving force output by the electric motor is transmitted to the shaft member, thereby making it possible to increase the propelling force when the shaft member is displaced.

(11) According to another exemplary embodiment, a vehicle brake system includes a hydraulic pressure generator configured to drive an electric motor according to an operation amount of a brake controller. The hydraulic pressure generator includes an electric actuator and a slave piston. The electric actuator is configured to translate rotational motion of a nut member that rotates by means of a rotational driving force of the electric motor, into linear motion of a shaft member. The slave piston is displaced within a cylinder main body as the shaft member, which is in the linear motion, is displaced so to compress a brake fluid to thereby generate the brake hydraulic pressure. A displacement speed of the slave piston relative to a rotating speed of the nut member is changeable.

The vehicle brake system with this configuration includes the hydraulic pressure generator that translates the rotational motion of the nut member into the linear motion of the shaft member. The brake hydraulic pressure is generated by the slave piston that is displaced in association with the displacement of the shaft member. With this hydraulic pressure generator, the displacement speed of the slave piston can be changed without changing the rotating speed of the nut member. Consequently, with this hydraulic pressure generator, the displacement speed of the slave piston can easily be changed. The displacement speed at which the slave piston is displaced within the cylinder main body can be increased, whereby the delay in rising of the brake hydraulic pressure is restricted.

According to the above exemplary embodiments, the vehicle brake system and the electric actuator can be provided which can suppress the brake hydraulic pressure from slowly rising.

DETAILED DESCRIPTION

Hereinafter, exemplary embodiments of the invention will be described in detail with reference to the accompanied drawings.

First Embodiment

Figure 1:
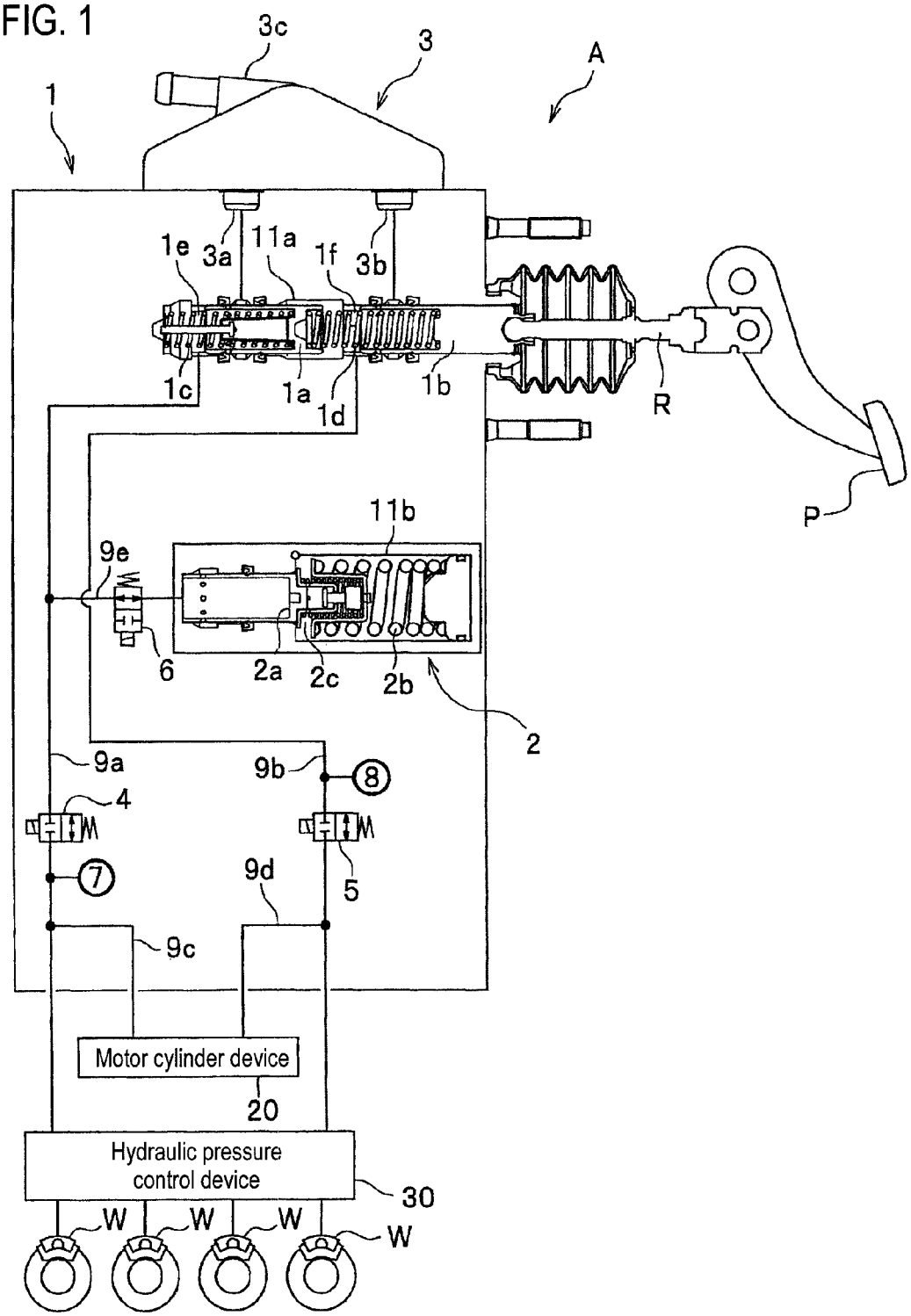
FIG. 1 is a schematic block diagram of a vehicle brake system according to a first embodiment of the invention.

A vehicle brake system A shown in FIG. 1 is configured so that a brake-by-wire brake system and a hydraulic brake system both function. The brake-by-wire brake system is configured to operate when a prime mover (an engine or a motor) is started. The hydraulic brake system is configured to operate when the prime mover is stopped. The vehicle brake system A includes a master cylinder 1, a stroke simulator 2, a hydraulic pressure generator (a motor cylinder device 20), and a vehicle stability assisting apparatus 30 (hereinafter, referred to as a "hydraulic pressure control device 30"). Then, the master cylinder 1, the stroke simulator 2, the motor cylinder device 20 and the hydraulic pressure control device 30 are communicated with each other via external piping.

A pair of main hydraulic pressure lines 9a, 9b are connected to the master cylinder 1. The main hydraulic pressure lines 9a, 9b include normally open shut-off valves (solenoid valves) 4, 5 and pressure sensors 7, 8, respectively. A communication hydraulic pressure line 9c and a branch hydraulic pressure line 9e branch off the main hydraulic pressure line 9a. A communication hydraulic pressure line 9d branches off the main hydraulic pressure line 9b.

The master cylinder 1 is a tandem-type master cylinder and has two master pistons (a first master piston 1a and a second master piston 1b). The two pistons are housed in a cylinder main body (a first cylinder bore 11a) and are disposed in series.

Of the two master pistons, the second master piston 1b is connected to a pushrod R that is connected, in turn, to a brake operator (a brake pedal P). Also, the first master piston 1a is connected to the second master piston 1b via a second return spring 1d. Furthermore, a first return spring 1c is disposed between a bottom portion of the first cylinder bore 11a and the first master piston 1a.

Also, in the first cylinder bore 11a, a first pressure chamber 1e is formed between the bottom portion and the first master piston 1a. In the first cylinder bore 11a, a second pressure chamber if is formed between the first master piston 1a and the second master piston 1b.

Pedal effort applied to the brake pedal P is input to the second master cylinder 1b via the pushrod R. Then, when the brake pedal P is depressed, the second master pin 1b is displaced. Furthermore, the pedal effort input to the second master piston 1b is input to the first master piston 1a, whereby the first master piston 1a is also displaced.

Then, a brake fluid is pressurized in the first pressure chamber 1e and the second pressure chamber if by the displacement of the first master piston 1a and the displacement of the second master piston 1b, respectively. Thereby, a brake hydraulic pressure is generated in the brake fluid.

A brake hydraulic pressure generated in the first pressure chamber 1e is output from the main hydraulic pressure line 9a. Also, a brake hydraulic pressure generated in the second pressure chamber if is output from the main hydraulic pressure line 9b.

Thus, the master cylinder 1 serves as a device that generates a brake hydraulic pressure by the displacement of the two master pistons (the first master piston 1a and the second master piston 1b), according to a depression amount of the brake pedal P.

The stroke simulator 2 serves as a device that generates a pseudo operating reaction force in the brake pedal P, which is depressed. The stroke simulator 2 includes a piston 2a and two return springs (a first simulator spring 2b and a second simulator spring 2c). The piston 2a slides in a cylinder main body (a second cylinder bore 11b). The first simulator spring 2b and the second simulator spring 2c bias the piston 2a.

The first simulator spring 2b is larger in spring constant, coil diameter (diameter of a coil spring making up the first simulator spring 2b) and wire diameter (diameter of a wire material that makes up the coil spring) than the second simulator spring 2c. In the stroke simulator 2, the piston 2a, the second simulator spring 2c and the first simulator spring 2b are disposed sequentially in this order.

Also, the second cylinder bore 11b of the stroke simulator 2 communicates with the first pressure chamber 1e via the main hydraulic pressure line 9a and the branch hydraulic pressure line 9e. The stroke simulator 2 operates based on the brake hydraulic pressure generated in the first pressure chamber 1e.

The piston 2a is displaced when the brake hydraulic pressure generated in the first pressure chamber 1e of the master cylinder 1 is input to the second cylinder bore 11b of the stroke simulator 2. As this occurs, the second simulator spring 2c and the first simulator spring 2b are compressed sequentially in this order according to a magnitude of the brake hydraulic pressure, to thereby generate a reaction force in the piston 2a. Then, the reaction force generated in the piston 2a is input to the master cylinder 1 via the branch hydraulic pressure line 9e and the main hydraulic pressure line 9a. The reaction force input to the master cylinder 1 is imparted to the brake pedal P and then constitutes the operating reaction force.

The master cylinder 1 includes a reservoir 3. The reservoir 3 is a receptacle that stores the brake fluid and includes fluid filler ports 3a, 3b and a piping connection port 3c. The fluid filler ports 3a, 3b are connected to the master cylinder 1. A hose extending from a main reservoir (not show) is connected to the piping connection port 3c.

The normally open shut-off valves 4, 5 open and close the main hydraulic pressure lines 9a, 9b, respectively. Each of the normally open shut-off valves 4, 5 include a normally open solenoid valve. The shut-off valve 4 opens and closes the main hydraulic pressure line 9a in a section between a branch point where the branch hydraulic pressure line 9e branches off the main hydraulic pressure line 9a and a branch point where the communication hydraulic pressure line 9c branches off the main hydraulic pressure line 9a. The normally open shut-off valve 5 opens and closes the main hydraulic pressure line 9b at a position on an upstream side of a branch point where the communication hydraulic pressure line 9d branches off the main hydraulic pressure line 9b.

A normally closed shut-off valve 6 opens and closes the branch hydraulic pressure line 9e. The normally closed shut-off valve 6 includes a normally closed solenoid valve.

The pressure sensors 7, 8 are sensors that detect brake hydraulic pressures generated in the master cylinder 1. The pressure sensors 7, 8 are provided in sensor installation holes (not shown) that communicate with the main hydraulic pressure lines 9a, 9b. The pressure sensor 7 is disposed on an downstream side of the normally open shut-off valve 4. The pressure sensor 7 is configured to be able to detect a brake hydraulic pressure that is generated in the brake fluid in the motor cylinder device 20 when the normally shut-off valve 4 is closed (=when supply to the main hydraulic pressure line 9a is shut off). The pressure sensor 8 is disposed on an upstream side of the normally open shut-off valve 5. The pressure sensor 8 detects a brake hydraulic pressure that is generated in the master cylinder 1 when the normally open shut-off valve 5 is closed (=when supply to the main hydraulic pressure line 9b is shut off). The hydraulic pressures, which are detected by the pressure sensors 7, 8, are converted into detection signals, and the obtained detection signals are input to an electronic control unit (ECU; not shown).

The main hydraulic pressure lines 9a, 9b are hydraulic pressure lines that originate from the master cylinder 1. The main hydraulic pressure line 9a is connected to the first pressure chamber 1e. The main hydraulic pressure line 9b is connected to the second pressure chamber 1f. Also, the main hydraulic pressure lines 9a, 9b are individually connected to the hydraulic pressure control device 30. The communication hydraulic pressure lines 9c, 9d are hydraulic pressure lines that branch off the main hydraulic pressure lines 9a, 9b, respectively and are individually connected to the motor cylinder device 20.

The branch hydraulic pressure line 9e is a hydraulic line that branches off the main hydraulic pressure line 9a and that reaches the stroke simulator 2.

The master cylinder 1 communicates with the hydraulic pressure control device 30 via the main hydraulic pressure lines 9a, 9b. The brake hydraulic pressure generated in the master cylinder 1 is input to the hydraulic pressure control device 30 via the main hydraulic pressure lines 9a, 9b when the normally open shut-off valves 4, 5 are open.

Figure 2:
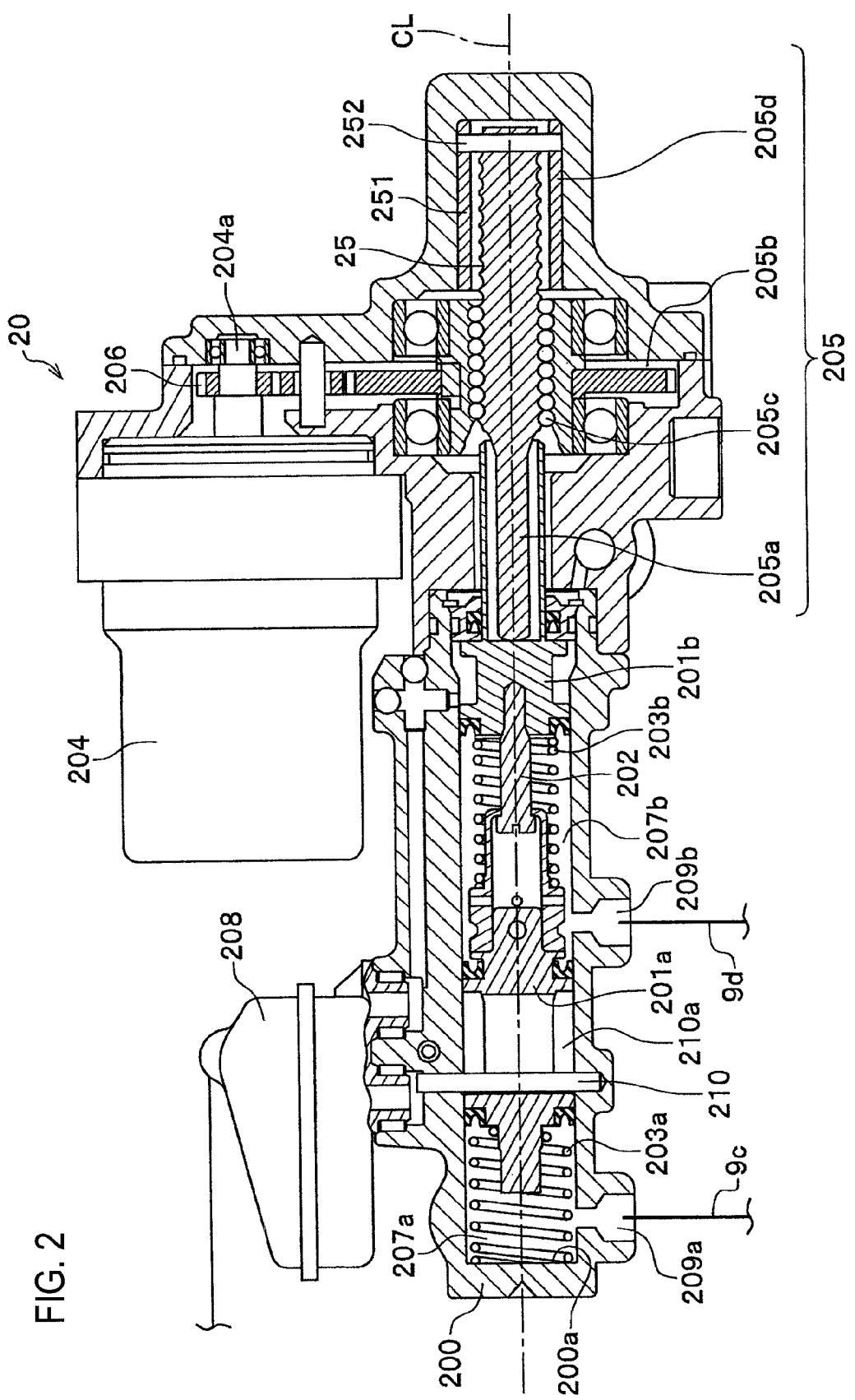
FIG. 2 is a diagram showing the configuration of a motor cylinder device.

As shown in FIG. 2, the motor cylinder device 20 includes two slave pistons (a first slave piston 201a and a second slave piston 201b) that are connected together by a restriction pin 202.

The first slave piston 201a and the second slave piston 201b are disposed in series in an interior of a cylinder main body 200 that is a base body. Then, the restriction pin 202 restricts maximum displacements of the first slave piston 201a and the second slave piston 201b.

A second return spring 203b is disposed between the first slave piston 201a and the second slave piston 201b. Also, a first return spring 203a is disposed between a bottom portion 200a of the cylinder main body 200 and the first slave piston 201a.

A second hydraulic pressure chamber 207b is formed between the first slave piston 201a and the second slave piston 201b. Also, a first hydraulic pressure chamber 207a is formed between the bottom portion 200a of the cylinder main body 200 and the first slave piston 201a.

The motor cylinder device 20 includes a stopper pin 210 that restricts a range in which the first slave piston 201a can move. A flat through hole 210a is formed in the first slave piston 201a. The stopper pin 210 is disposed so as to penetrate through the through hole 210a and is fixed to the cylinder main body 200. Then, an end portion of the through hole 210a that faces the bottom portion 200a constitutes a withdrawal limit of the first lave piston 201a. An end portion of the through hole 210a that faces the second slave piston 201b constitutes an advance limit of the first slave piston 201a.

The cylinder main body 200 includes a ball screw structure 205 in an interior thereof. The ball screw structure 205 is an electric actuator. The ball screw structure 205 translates rotational motion of a rotational shaft 204a of an electric motor (an electric motor 204) into linear motion.

The ball screw structure 205 includes a shaft member (a ball screw shaft 205a), a nut member (a ball screw nut 205b), a plurality of power transmission members (balls 205c), and an end cap 205d.

The ball screw shaft 205a is a shaft member that is connected to the second slave piston 201b. In the first embodiment, an end portion of the ball screw shaft 205a is in abutment with an end surface of the second slave piston 201b. A spiral groove 25 is formed on an outer circumference of the ball screw shaft 205a. When the ball screw shaft 205a is in linear motion (displaced) in an axial direction (a direction along a center line CL), the ball screw shaft 205a displaces the second slave piston 201b in an axial direction of the cylinder main body 200.

The ball screw nut 205b is a nut member that is fitted onto the ball screw shaft 205a and that rotates around (an outer circumference of) the ball screw shaft 205a. Gear teeth are formed on an outer circumference of the ball screw shaft 205b so as to mesh with transmission gears 206. The rotation of the rotational shaft 204a of the electric motor 204 is transmitted to the ball screw nut 205b via the transmission gears 206.

Also, the balls 205c are disposed between the grooves 25 of the ball screw shaft 205a and an male thread provided on an inner circumference of the ball screw nut 205b. The balls 205c roll in the groove 25 as the ball screw nut 205b rotates, so as to move around the outer circumference of the ball screw shaft 205a. Then, the balls 205c that move around in such a way while rolling feed out the spiral groove 25, whereby the ball screw shaft 205a is in linear motion in the axial direction and is displaced.

In this way, in the ball screw structure 205, the rotational driving force of the electric motor 204 rotates the ball screw nut 205b, whereby the ball screw shaft 205a is in linear motion. The ball screw shaft 205a that is in linear motion and is displaced causes the second slave piston 201b to be in linear motion (to be displaced). That is, the ball screw structure 205 has a function to translate the rotational motion of the ball screw nut 205b that rotates by means of the rotational driving force of the electric motor 204 into the linear motions of the ball screw shaft 205a and the second slave piston 201b.

Also, a speed reduction gear mechanism includes the plurality of transmission gears 206. The rotational speed of the rotational shaft 204a of the electric motor 204 is reduced as required by the speed reduction gear mechanism and is transmitted to the ball screw nut 205b. A gear ratio (reduction ratio) of the speed reduction gear mechanism including the plurality of transmission gears 206 is set appropriately based on the performance of the electric motor 204 and/or a performance that is required on the motor cylinder device 20.

Also, the end cap 205d (a guide portion of the first embodiment) covers an end portion (an end portion to which the second slave piston 201b is not connected) of the ball screw shaft 205a. This end cap 205d is fixed to the cylinder main body 200 so that the end cap 205d cannot rotate. Guide grooves (slits 251) are formed in the end cap 205d so as to extend in the axial direction. Protrusion portions (guide pins 252) that protrude from the outer circumference of the ball screw shaft 205a are brought into engagement with the slits 251.

Fitting of the guide pins 252 into the slit 251 restricts the ball screw shaft 205a from rotating about the axial direction (rotating about the center line CL). Also, when the ball screw shaft 205a is displaced in the axial direction, the guide pins 252 that are displaced together with the ball screw shaft 205a are guided by the slit 251.

The cylinder main body 200 includes a reservoir 208 so as to store a brake fluid that is supplied to the cylinder main body 200.

The electric motor 204 is driven based on a control signal that is input from the electronic control unit (not shown), so as to rotate the rotational shaft 204a. The rotation of the rotational shaft 204a is transmitted to the ball screw nut 205b via the plurality of transmission gears 206, which causes the ball screw nut 205b to rotate (move) around the outer circumference of the ball screw shaft 205a. When the ball screw nut 205b rotates round the circumference of the ball screw shaft 205a, the balls 205c roll. The balls 205c circulate along the groove 25 that is formed spirally on the outer circumference of the ball screw shaft 205a while rolling to move around the ball screw shaft 205a. Thereby, the ball screw shaft 205a is displaced in the axial direction.

In this way, the ball screw shaft 205a of the ball screw structure 205 is in linear motion by means of the rotational driving force that is output by the electric motor 204.

When the ball screw shaft 205a is displaced in the direction of the bottom portion 200a of the cylinder main body 200, the second slave piston 201b is displaced in the direction of the bottom portion 200a, and the second return spring 203b is compressed. Furthermore, the first slave piston 201a is displaced in the direction of the bottom portion 200a by means of the reaction force of the second return spring 203b so compressed.

Then, the brake fluid is compressed in the first hydraulic pressure chamber 207a and the second hydraulic pressure chamber 207b by the displacements of the first slave piston 201a and the second slave piston 201b to thereby generate brake hydraulic pressures. The brake hydraulic pressure generated in the first hydraulic pressure chamber 207a is output from a first output port 209a to the communication hydraulic pressure line 9c. The brake hydraulic pressure generated in the second hydraulic pressure chamber 207b is output from a second output port 209b to the communication hydraulic pressure line 9d.

The brake hydraulic pressures generated in the first hydraulic pressure chamber 207a and the second hydraulic pressure chamber 207b of the motor cylinder device 20 are input to the hydraulic pressure control device 30 via the communication hydraulic pressure lines 9c, 9d and the main hydraulic pressure lines 9a, 9b, which are shown in FIG. 1. The hose (not shown) that extends from the reservoir 3 (see FIG. 1) is connected to the reservoir 208.

The motor cylinder device 20, which is configured as shown in FIG. 2, generates a brake hydraulic pressure in accordance with a depression amount of the brake pedal P (see FIG. 1) by the drive of the electric motor 204. Also, the ball screw structure 205a provided in the motor cylinder device 20 causes the ball screw shaft 205 to be in linear motion in the axial direction, by means of the rotational driving force output by the electric motor 204.

The hydraulic pressure control device 30 shown in FIG. 1 is configured to execute an antilock braking control (an ABS control) that controls slip of wheels, and a skid control and a traction control that stabilize the behavior of the vehicle. The hydraulic pressure control device 30 is connected to wheel cylinders W, W, . . . via tubes. Although not shown, the hydraulic pressure control device 30 includes a hydraulic pressure unit in which solenoid valves, a pump and the like are provided, a motor that drives the pump, an electronic control unit that controls the solenoid valves and the motor, and the like.

Figure 3:
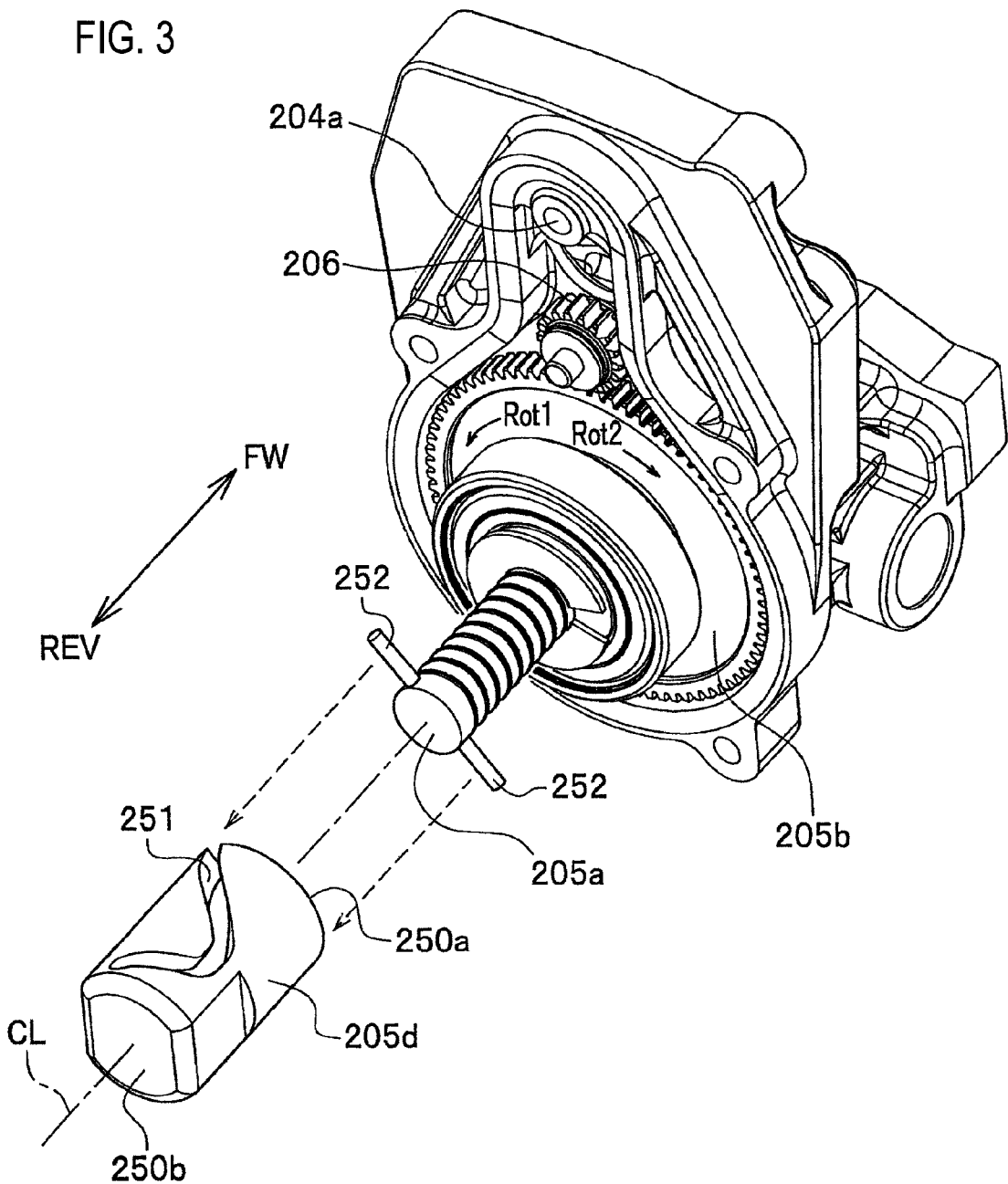
FIG. 3 is a perspective view showing an end cap that is fitted onto a ball screw shaft.

FIG. 3 is a perspective view showing the end cap 205d, which is fitted onto the ball screw shaft 205a.

The end cap 205d is a cylindrical member having a bottom surface and an opening at one end thereof. Specifically, the end cap 205d includes an opening portion 250a provided at an open end thereof and a closed portion 250b at a closed end thereof. The end portion (the end portion to which the second slave piston 201b is not connected) of the ball screw shaft 205a is housed inside the end cap 205d. The slits 251 (guide grooves) are formed in a circumferential wall of the end cap 205d so as to penetrate through the end cap 205d.

The slits 251 are brought into engagement with the guide pins 252 (protrusion portions), which protrude from the outer circumference of the ball screw shaft 205a. Then, the slits 251 guide the movement of the guide pins 252 when the ball screw shaft 205a is displaced. Thereby, when the ball screw shaft 205a is displaced, the guide pins 252 move to follow the shape of the slits 251.

Also, the end cap 205d is fixed to the cylinder main body 200 (see FIG. 2). With this configuration, the guide pins 252, which are in engagement with the slits 251 of the end cap 205d, restrict the ball screw shaft 205a from rotating about the axis thereof.

Furthermore, when the slits 251 of the end cap 205d guide the guide pins 252, the linear motion of the ball screw shaft 205a is guided by the slits 251. In this way, the end cap 205d functions as a guide portion that guides the linear motion of the ball screw shaft 205a.

The two slits 251 are formed in the end cap 205d at positions that are diametrically opposite to each other on an outer circumference of the end cap 205d (that is, positions that are offset 180 degrees with respect to the center line CL). The pair of guide pins 252 is provided so as to be individually in engagement with the two slits 251. These guide pins 252, 252 are formed by causing both end portions of a pin member that penetrates the ball screw shaft 205a to protrude from the outer circumference of the ball screw shaft 205a.

Then, the ball screw shaft 205a withdraws from the end cap 205d when the ball screw shaft 205a is displaced in a direction in which the ball screw shaft 205a moves towards the bottom portion 200a (see FIG. 2) of the cylinder main body 200. Also, the ball screw shaft 205a is housed in the end cap 205d when the ball screw shaft 205a is displaced in the direction in which the ball screw shaft 205a moves away from the bottom portion 200a. A direction in which the ball screw shaft 205a advances (is displaced) when the ball screw shaft 205a is displaced in the direction in which the ball screw shaft 205a withdraws from the end cap 205d (in a direction the ball screw shaft 205a moves toward the bottom portion 200a of the cylinder main body 200) will be referred to as a "forward direction FW." Also, a direction in which the ball screw shaft 205a advances (is displaced) when the ball screw shaft 205a is displaced in the direction in which the ball screw shaft 205a is housed in the end cap 205d (in the direction in which the balls screw shaft 205a moves away from the bottom portion 200a of the cylinder main body 200) will be referred to as a "reverse direction REV."

That is, the motor cylinder device 20 (see FIG. 2) is configured so that when the ball screw shaft 205a is displaced in the forward direction FW, the second slave piston 201b and the first slave piston 201a (see FIG. 2) are displaced to thereby generate brake hydraulic pressures.

Also, when the ball screw shaft 205a is displaced in the forward direction FW or the reverse direction REV, the guide pins 252 move while being guided by the slits 251. Thus, the linear motion of the ball screw shaft 205a is guided by the slits 251.

Also, the directions (the forward direction FW and the reverse direction REV) in which the ball screw shaft 205a is displaced are switched as the rotational directions of the ball screw nut 205b are switched. For example, as shown in FIG. 3, when the ball screw nut 205b rotates in a left direction (Rot1) as seen from the end cap 205d side, the ball screw shaft 205a is displaced in the forward direction FW. Also, when the ball screw nut 205b rotates in a right direction (Rot2), the ball screw shaft 205a is displaced in the reverse REV direction.

Hereinafter, when the rotational directions of the ball screw nut 205b are referred to, the rotational directions of the ball screw nut 205b should be directions when the ball screw nut 205b is seen from the end cap 205d side.

Figure 4:
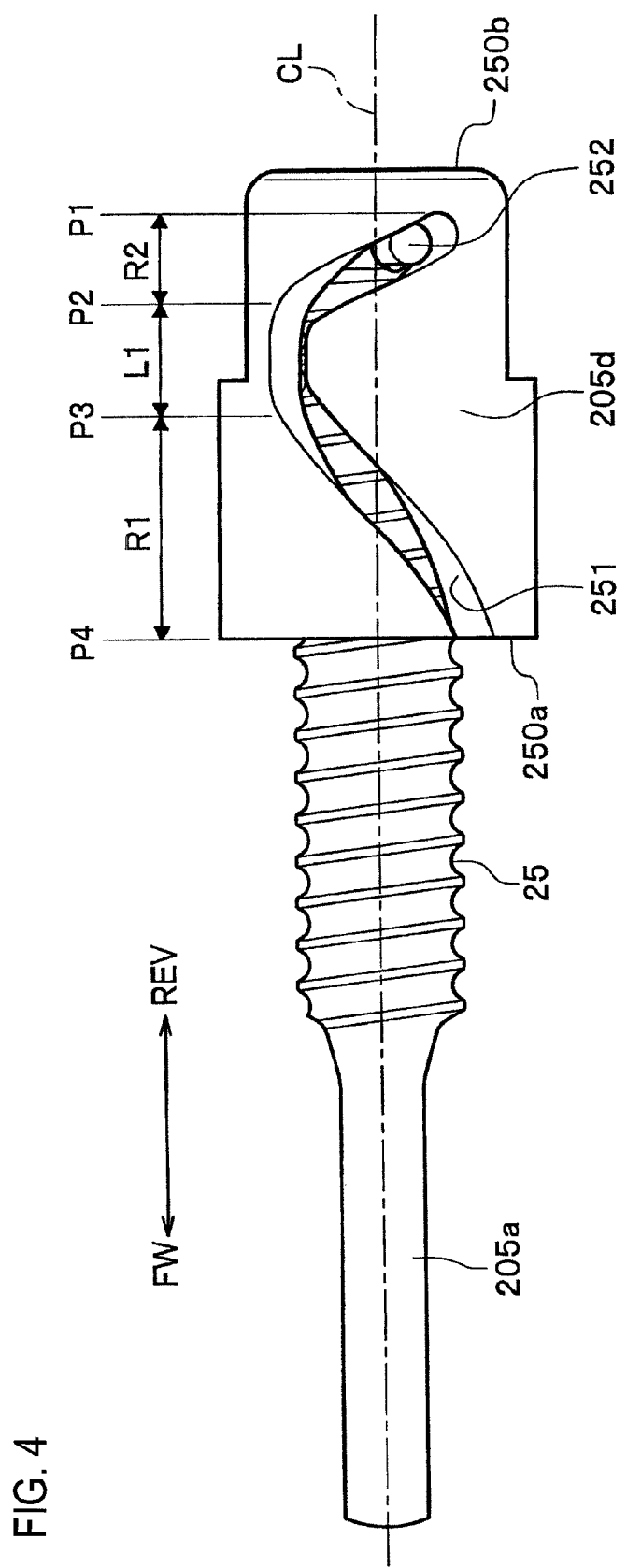
FIG. 4 is a diagram showing a shape of a slits that are formed in the end cap.

FIG. 4 is a diagram showing a shape of the slits 251 formed in the end cap 205d.

As shown in FIG. 4, the slits 251 are formed in the end cap 205d of the first embodiment so as to extend from the closed end where the closed end portion 250b is provided to the open end where the opening portion 250a is provided.

Then, each slit 251 of the first embodiment is divided into a first inclination portion R1 on the opening portion 250a side and a second inclination portion R2 on the closed portion 250b side. In the first inclination portion R1, the slit 251 is inclined with respect to the axial direction. In the second inclination portion R2, the slit 251 is inclined with respect to the axial direction towards the closed portion 250b. Also, a linear straight-line portion L1 is formed between the first inclination portion R1 and the second inclination portion R2. In the straight-line portion L1, the slit 251 is parallel to the axial direction of the ball screw shaft 205a.

The second inclination portion R2 is formed from a predetermined start point P1 located on the closed portion 250b side to a termination point P2 located on the opening portion 250a side. Also, the straight-line portion L1 is formed from a start point that is the termination point P2 of the second inclination portion R2 to a termination point P3 that is located on the opening portion 250a side of the start point (termination point P2). The first inclination portion R1 is formed from a start point that is the termination point P3 of the straight-line portion L1 to a termination point P4 that is located at the opening portion 250a.

The termination portion P2 of the second inclination portion R2 is located in a position which is obtained by rotating the start point P1 about the center line CL. That is, when seen from the closed portion 250b side, the termination point P2 of the second inclination portion R2 is located in a position which is obtained by rotating the start point P1 about the center line CL by a predetermined angle.

Also, the termination point P4 of the first inclination portion R1 is located in a position obtained by rotating the start point P3 about the center line CL. That is, when seen from the closed portion 250b side, the termination point P4 of the first inclination portion R1 is located in a position obtained by rotating the start point P3 about the center line CL by a predetermined angle.

The rotation direction from the start point P1 to the termination point P2 of the second inclination portion R2 is opposite to the rotation direction from the start point P3 to the termination point P4 of the first inclination portion R1. In this way, the slits 251 that wind relative to the axial direction of the ball screw shaft 205a to exhibit an angular shape is formed in the end cap 205d of the first embodiment.

The second inclination portion R2 is formed so as to rotate the guide pins 252 rightwards about the center line CL as seen from the closed portion 250b side when the ball screw shaft 205a is displaced in the forward direction FW. Also, the first inclination portion R1 is formed so as to rotate the guide pins 252 leftwards as seen from the closed portion 250b side when the ball screw shaft 205a is displaced in the forward direction FW. With this configuration, when the ball screw shaft 205a is displaced in the forward direction FW with the guide pin 252 guided by the second inclination portion R2, the ball screw shaft 205a rotates rightwards about the axis as seen from the end cap 205d side. The ball screw shaft 205a rotates leftwards as seen from the end cap 205d side when the guide pin 252 is guided by the first inclination portion R1. When referred to hereinafter, the rotational direction of the ball screw shaft 205a about the axis is the rotational direction as seen from the end cap 205d side.

That is, the slits 251 of the first embodiment have the first inclination portion R1 and the second inclination portion R2. The first inclination portion R1 and the second inclination portion R2 constitute a rotating mechanism portion that rotates the ball screw shaft 205a about the axis when the ball screw shaft 205a is in linear motion (when the ball screw shaft 205a is displaced in the forward direction FW). In other words, the rotating mechanism portion that rotates the ball screw shaft 205a, which is in linear motion, about the axis includes the slits 251.

When the slits 251 are formed as shown in FIG. 4, the ball screw shaft 205a that is displaced in the forward direction FW as the ball screw nut 205b (see FIG. 3) rotates in the left direction Rot1 (leftward rotation) rotates as (1) to (3) below.
(1) When the guide pins 252 are guided by the second inclination portion R2, the ball screw shaft 205a rotates rightwards, and the ball screw nut 205b and the ball screw shaft 205a rotate in opposite directions.
(2) When the guide pins 252 are guided by the straight-line portion L1, the ball screw shaft 205a does not rotate.
(3) When the guide pins 252 are guided by the first inclination portion R1, the ball screw shaft 205a rotates leftwards, and the ball screw nut 205b and the ball screw shaft 205a rotate in the same direction.

Furthermore, the rotating speed of the ball screw nut 205b is faster than the rotating speed of the ball screw shaft 205a. That is, even if the ball screw nut 205b has completed a single rotation, the ball screw shaft 205a has not yet completed a single rotation.

The second inclination portion R2 constitutes a reverse rotating portion that rotates the ball screw shaft 205a, which is displaced in the forward direction FW, in an opposite direction to the direction in which the ball screw nut 205b (see FIG. 3) rotates. Furthermore, the first inclination portion R1 constitutes a forward rotating portion that rotates the ball screw shaft 205a, which is displaced in the forward direction FW, in the same direction as the direction in which the ball screw nut 205b rotates.

In this way, the end cap 205d (the slits 251) rotate the ball screw shaft 205a, which is in linear motion, about the axis.

The motor cylinder device 20 (see FIG. 2) generates no brake hydraulic pressure in such a state that the ball screw shaft 205a (see FIG. 3) is displaced to a termination position in the reverse direction REV (this state will be referred to as an "initial state"). Consequently, the initial state is a state in which the ball screw shaft 205a is not displaced and no brake hydraulic pressure is generated in the motor cylinder device 20. Furthermore, when the motor cylinder device 20 is in the initial state, the guide pins 252 (see FIG. 3) of the ball screw shaft 205a are located in the second inclination portion R2 (see FIG. 4) of the slits 251.

The motor cylinder device 20 generates brake hydraulic pressures when the electric motor 204 (see FIG. 2) is driven to displace the ball screw shaft 205a in the forward direction FW.

When the motor cylinder device 20 (see FIG. 2) is in the initial state, the guide pins 252 (see FIG. 3) are located in the second inclined portions R2 (see FIG. 4) of the slits 251. Thus, the guide pins 252 (see FIG. 3) are guided by the second inclination portion R2 at a point in time when the electric motor 204 (see FIG. 2) is started with the motor cylinder device 20 being in the initial state to cause the ball screw shaft 205a (see FIG. 3) to start its displacement in the forward direction FW. Therefore, the rotation direction of the ball screw nut 205b (see FIG. 3) that rotates in the left direction Rot1 differs from the rotation direction (rightward rotation) of the ball screw shaft 205a in an initial stage of starting of the electric motor 204 (initial stage of motor starting). That is, the ball screw shaft 205a rotates in the opposite direction to the direction in which the ball screw nut 205b rotates in the initial stage of the starting of the electric motor 204.

The second inclined portions R2 continue to guide the guide pins 252 (see FIG. 3) until the ball screw shaft 205a is displaced by a predetermined amount from its initial state. In the first embodiment, a range where the second inclined portions R2 are formed (until the ball screw shaft 205a is displaced by the predetermined amount from its initial state) is referred to as an "initial displacement." It is preferable that a length of the initial displacement (that is, the predetermined displacement amount from the initial state) is set appropriately based on a performance that is required for the motor cylinder device 20 (see FIG. 2) or the like.

When the ball screw shaft 205a (see FIG. 3) rotates in the opposite direction to the direction in which the ball screw nut 205b (see FIG. 3) rotates, the relative rotating speed of the ball screw shaft 205a to the ball screw nut 205b becomes higher than when the ball screw shaft 205a does not rotate. This provides an effect that is equivalent to an effect in the case where the rotating speed of the ball screw nut 205b is increased.

Therefore, the displacement speed of the ball screw shaft 205a at which the ball screw shaft 205a is displaced in the forward direction FW becomes higher than in the case where the ball screw shaft 205a does not rotate. Then, the displacement speeds of the second slave piston 201b and the first slave piston 201a (see FIG. 2) are increased.

That is, the ball screw shaft 205a (see FIG. 3) rotates in the opposite direction to the direction in which the ball screw nut 205b (see FIG. 3) rotates during the initial displacement from the initial state, which increases the displacement speed of the ball screw shaft 205a at which the ball screw shaft 205a is displaced in the forward direction FW.

The increase in the relative rotating speed of the ball screw shaft 205a to the ball screw nut 205b is equivalent to the reduction in gear ratio between the ball screw nut 205b and the ball screw shaft 205a. In other words, the increase in relative rotating speed produces an effect that is equivalent to an effect that would be obtained by reduction of a gear ratio at which the rotational driving force output by the electric motor 204 (see FIG. 2) is transmitted to the ball screw shaft 205a.

When the ball screw shaft 205a (see FIG. 3) is displaced in the forward direction FW with the guide pins 252 (see FIG. 3) guided by the first inclined portions R1 (see FIG. 4) of the slits 251, the ball screw shaft 205a rotates leftwards. Therefore, the rotation direction of the ball screw nut 205b, which rotates in the left direction Rot1, coincides with the rotation direction of the ball screw shaft 205a (leftward rotation). That is, the ball screw shaft 205a rotates in the same direction as the ball screw nut 205b rotates in.

This reduces the displacement speed at which the ball screw shaft 205a is displace in the forward direction FW to be lower than that in the case where the ball screw shaft 205a does not rotate. That is, the displacement speeds of the second slave piston 201b and the first slave piston 201a are reduced.

It is preferable that the first inclination portion R1 (see FIG. 4) in the end cap 205d is provided in a range where the ball screw shaft 205a is displaced in the forward direction FW more than a predetermined reference amount that is set in advance. Furthermore, it is preferable that the reference amount of displacement of the ball screw shaft 205a which defines the first inclination portion R1 is set appropriately based on the performance required for the motor cylinder device 20 (see FIG. 2) or the like.

When the ball screw shaft 205a (see FIG. 3) rotates in the same direction as the direction in which the ball screw nut 205b (see FIG. 3) rotates, the relative rotating speed of the ball screw shaft 205a to the ball screw nut 205b becomes lower than that in the case where the ball screw shaft 205a does not rotate. This produces an effect that is equivalent to an effect obtained by an increase of a gear ratio between the ball screw nut 205b and the ball screw shaft 205a. In other words, the reduction in the relative rotating speed produces an effect that is equivalent to an effect obtained by an increase of the gear ratio at which the rotational driving force output by the electric motor 204 (see FIG. 2) is transmitted to the ball screw shaft 205a.

If the gear ratio between the ball screw nut 205b and the ball screw shaft 205a is increased, although the displacement speed of the ball screw shaft 205a is reduced, a torque that is transmitted from the ball screw nut 205b to the ball screw shaft 205a is increased. Thereby, a propelling force that displaces the ball screw shaft 205a in the forward direction FW is increased. Therefore, although the displacement speeds of the second slave piston 201b and the first slave piston 201a (see FIG. 2) are reduced, a propelling force for displacements of the second slave piston 201b and the first slave piston 201a is increased.

In this way, the vehicle brake system A (the motor cylinder device 20) of the first embodiment shown in FIG. 1 is configured so as to change the displacement speeds of the slave pistons (the first slave piston 201a and the second slave piston 201b) relative to the rotating speed of the ball screw nut 205b shown in FIG. 2.

Next, an operation of the vehicle brake system A shown in FIG. 1 will be described briefly.

When a driver depresses the brake pedal P while the vehicle brake system A is in a normal state in which the vehicle brake system A operates normally, the normally open shut-off valves 4, 5 are closed, and the normally closed shut-off valve 6 is opened. Then, brake hydraulic pressures that are generated in the master cylinder 1 are not transmitted to wheel cylinders W but transmitted to the stroke simulator 2 and the piston 2a is displaced. Thereby, a stroke of the brake pedal P is permitted, and a pseudo reaction force is imparted to the brake pedal P.

When the depression of the brake pedal P is detected by a stroke sensor (not shown) or the like, the electric motor 204 (see FIG. 2) of the motor cylinder device 20 is driven, and brake hydraulic pressures are generated in the cylinder main body 200 (see FIG. 2).

The electronic control unit (not shown) calculates an appropriate brake hydraulic pressure (target hydraulic pressure) in accordance with the depression amount of the brake pedal P. Then, the electronic control unit controls the motor cylinder device 20 (the electric motor 204) so that a brake hydraulic pressure output from the motor cylinder device 20 (a brake hydraulic pressure detected by the pressure sensor 7) becomes the calculated target hydraulic pressure.

The brake hydraulic pressure that is generated in the motor cylinder device 20 is transmitted to the individual wheel cylinders W, W, . . . via the hydraulic pressure control device 30, which activates the individual wheel cylinders W. Thereby, a braking force is imparted to each wheel.

In a situation in which the motor cylinder device 20 does not operate (due to, for example, no electric power being fed or emergency situation), both the normally open shut-off valves 4, 5 are opened, and the normally closed shut-off valve 6 is closed. Thus, the brake hydraulic pressure generated in the master cylinder 1 is transmitted to the wheel cylinders W, W, . . . .

Figure 5:
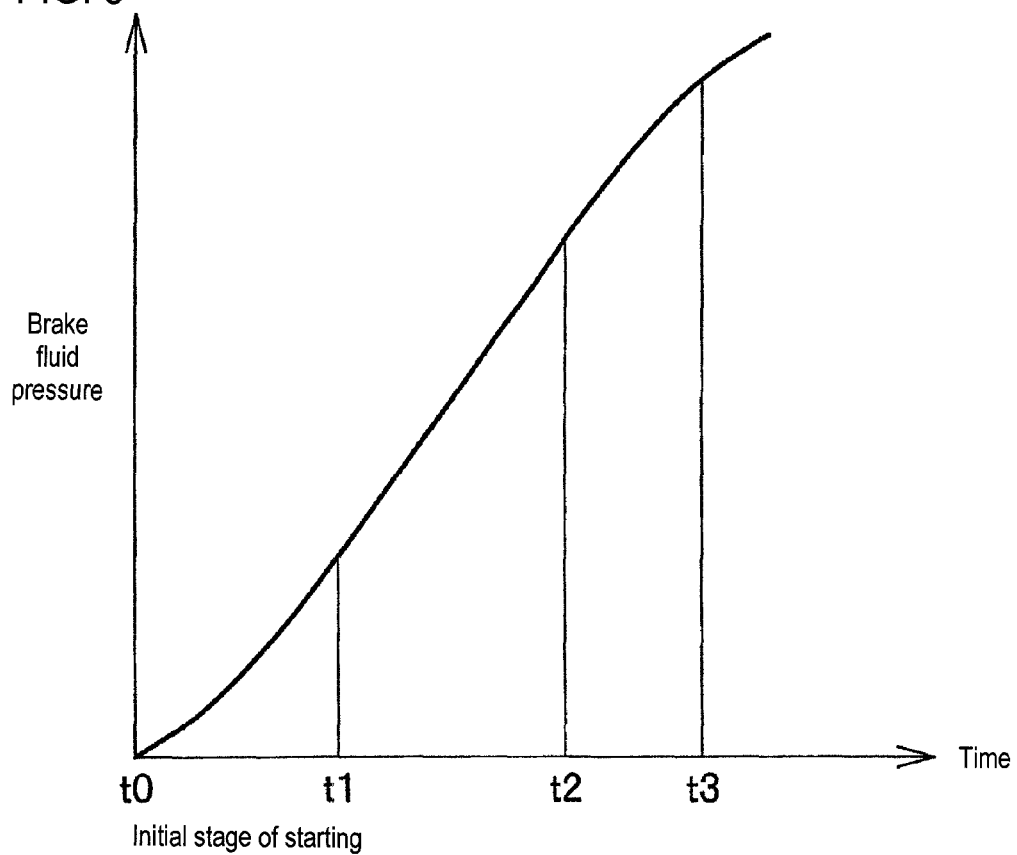
FIG. 5 is a graph showing a change, with time, in brake hydraulic pressure generated in the motor cylinder device from an initial operating stage of an electric motor.

FIG. 5 is a graph showing a change, with time, in brake hydraulic pressure generated in the motor cylinder device from the initial stage of electric-motor starting. In the graph shown in FIG. 5, abscissa denotes time, and ordinate denotes hydraulic pressure.

In the related art, the ball screw shaft 205a (see FIG. 4) is made not to rotate about the axis (about the center line CL). Therefore, there may be a situation in which if the rotating speed of the rotational shaft 204a (see FIG. 2) of the electric motor 204 is slow in the initial stage of starting of the electric motor 204 (see FIG. 2), transmission of brake hydraulic pressures that are generated by the operation of the first slave piston 201a and the second slave piston 201b (see FIG. 2) to the wheel cylinders W (see FIG. 1) is delayed due to a loss of brake fluid pressure. Also, when the brake hydraulic pressure that is transmitted to the wheel cylinders W is high, a motor load is increased to exceed the torque generated, which delays the displacement speeds of the first slave piston 201a and the second slave piston 201b.

Therefore, in the related art, rising of brake hydraulic pressure is delayed in the initial stage (t0 to t1) of the starting of the electric motor 204 (see FIG. 2). When the brake hydraulic pressure is high, an increase speed of the brake hydraulic pressure becomes slow.

To deal with this, the ball screw shaft 205a (see FIG. 3) of the first embodiment rotates in the opposite direction to the direction in which the ball screw nut 205b (see FIG. 3) rotates in the initial stage of the starting of the electric motor 204 (electric-motor starting; see FIG. 2) (generating the same state as a low gear ratio provides). Therefore, even if the rotating speed of the rotational shaft 204a (see FIG. 2) of the electric motor 204 is low, the ball screw shaft 205a is displaced in the forward direction FW quickly. Also, in association with this, the first slave piston 201a and the second slave piston 201b (see FIG. 2) are displaced quickly. This enables the brake hydraulic pressure generated in the motor cylinder device 20 to increase quickly, which makes it possible that the brake hydraulic pressure rises sharply (t0 to t1). A time period from the time t0 to the time t1 constitutes the initial displacement.

Thereafter, when the electric motor 204 is driven at a predetermined rotating speed, the brake hydraulic pressure generated in the motor cylinder device 20 (see FIG. 2) increases as specified (t1 to t2).

Furthermore, when the ball screw shaft 205a (see FIG. 3) is displaced in the forward direction FW and the guide pins 252 (see FIG. 3) is guided by the first inclined portions R1, the ball screw shaft 205a rotates in the same direction as the direction in which the ball screw nut 205b (see FIG. 3) rotates (generating the same state as a high gear ratio provides). This increases the torque that is transmitted from the ball screw nut 205b to the ball screw shaft 205a, which increases the propelling force that displaces the ball screw shaft 205a in the forward direction FW.

Then, the propelling force when the first slave piston 201a and the second slave piston 201b (see FIG. 2) becomes high. Therefore, even if the brake hydraulic pressure in the cylinder main body 200 (see FIG. 2) is high, the first slave piston 201a and the second slave piston 201b are displaced quickly. As a result, the quick increase in brake hydraulic pressure continues (t2 to t3).

In this way, with the motor cylinder device 20 of the first embodiment (see FIG. 2), the brake hydraulic pressure rises quickly in the initial stage (t0 to t1) of the starting of the electric motor 204 (see FIG. 2). Also, even with high brake hydraulic pressure, the quick increase in brake hydraulic pressure continues (t2 to t3).

Second Embodiment

Figure 6:
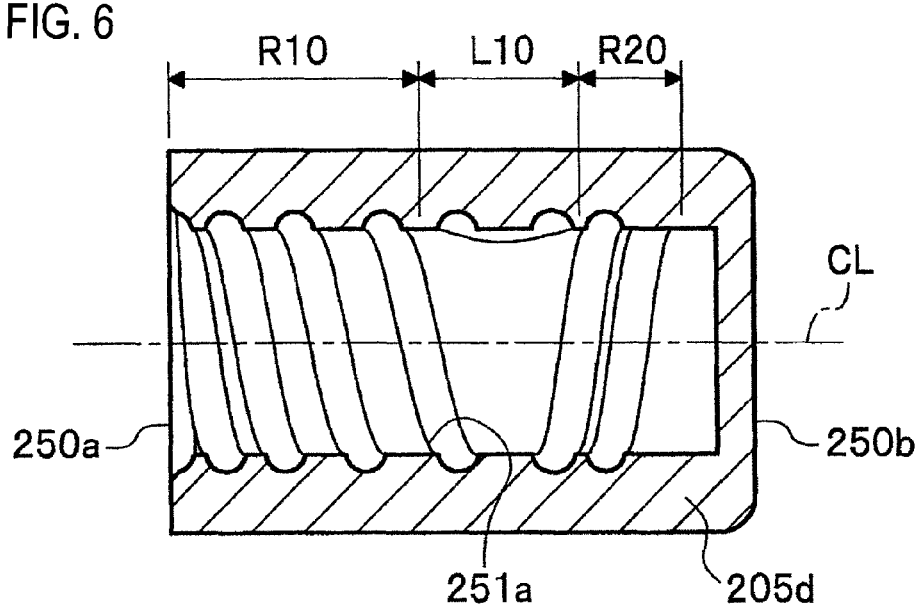
FIG. 6 is a sectional view of an end cap according to a second embodiment.

FIG. 6 is a sectional view of an end cap according to a second embodiment.

The second embodiment is different from the first embodiment in that an end cap 205d of the second embodiment has a different shape from that of the end cap 205d of the first embodiment (see FIG. 3).

For example, in the end cap 205d of the second embodiment, as shown in FIG. 6, a first spiral portion R10, a connecting portion L10 and a second spiral portion R20 are formed sequentially in this order from an end where an opening portion 250a is provided. The first spiral portion R10 and the second spiral portion 20 are each formed of a groove 251a that is formed to extend spirally around an inner wall of the end cap 205d. In the first spiral portion R10 and the second spiral portion R20, the grooves 251a go around in opposite directions. For example, if the groove 251a in the first spiral portion R10 extends leftwards from the opening portion 250a side to a closed portion 250b side as viewed from the closed portion 250b side, the groove 251a in the second spiral portion R10 extends rightwards direction from the opening portion 250a side to the closed portion 250b side as viewed from the closed portion 250b side. The connecting portion L10 is formed of a straight-line groove 251a that is formed on the inner wall of the end cap 205d so as to extend along a center line CL. Furthermore, the first spiral portion R10 and the second spiral portion R20 are connected by the connecting portion L10. Then, guide pins 252 (see FIG. 3) of a ball screw shaft 205a are guided by the first spiral portion R10, the connecting portion L10 and the second spiral portion R20.

In the first spiral portion R10 of the end cap 205d, a pitch of the groove 251a increases gradually from the end where the opening portion 250a is provided (the pitch expands gradually from the end where the opening portion 250a is provided).

The second spiral portion R20 is formed of the groove 251a that rotates the ball screw shaft 205a (see FIG. 3), which is displaced in a forward direction FW, rightwards around an axis thereof as seen from the closed portion 250b side. The first spiral portion R10 is formed of the groove 251a that rotates the ball screw shaft 205a, which is displaced in the forward direction FW, leftwards around the axis as seen from the closed portion 250b side.

Even with the end cap 205d having the shape described above, the ball screw shaft 205a (see FIG. 3) can be rotated in an opposite direction to a direction in which the ball screw nut 205b (see FIG. 3) rotates in an initial stage of starting of an electric motor 204 (electric-motor starting; see FIG. 2). Furthermore, with high brake hydraulic pressure, the ball screw shaft 205a can be rotated in the same direction as the direction in which the ball screw nut 205b rotates.

The invention is not limited to the exemplary embodiments described above, but may be modified in design as required without departing from the spirit and scope thereof.

For example, the slits 251 shown in FIG. 4 are made to penetrate the circumferential wall of the end cap 205d. However, such a configuration may be adopted that an internal groove (not shown) having the same shape as that of the slit 251 is formed on an inner wall of the end cap 205d, so that the guide pins 252 of the ball screw shaft 205a are guided by this internal groove.

Such a configuration may also be adopted that an internal groove (not shown) that guides the guide pins 252 is formed at a portion of the cylinder main body 200 (see FIG. 2) where the end portion of the ball screw shaft 205a (see FIG. 2) is housed. Also, this internal groove may have the same shape as that of the slit 251 shown in FIG. 4. By adopting this configuration, the end cap 205d shown in FIG. 3 is made unnecessary. Therefore, the number of parts involved in the motor cylinder device 20 (see FIG. 2) can be reduced.

In the electric actuator according to the first and second embodiments, the ball screw structure 205 (see FIG. 2) is provided, and the balls 205c that function as power transmission members are disposed between the ball screw nut 205b (see FIG. 2) and the ball screw shaft 205a (see FIG. 2). The power transmission members are not limited to the balls 205c. For example, such a configuration may be adopted that roller members (not shown) that roll in response to the rotation of the ball screw nut 205b are provided as power transmission members.

What is claimed is:
1. An electric actuator comprising:
   a shaft member on an outer circumference of which a spiral groove is formed;
   a nut member that is fitted onto the shaft member;
   a power transmission member that is disposed between an inner circumference of the nut member and the groove; and
   a guide portion configured to guide linear motion of the shaft member, wherein
   rotation of the nut member about the shaft member by means of a rotational driving force of an electric motor results in the linear motion of the shaft member, and
   the guide portion includes a rotating mechanism portion configured to rotate the shaft member about an axis when the shaft member is in the linear motion,
   wherein the guide portion includes a reverse rotating portion configured to rotate the shaft member, which is in the linear motion, in an opposite direction to a rotation direction of the nut member, and
   wherein the guide portion includes a forward rotating portion configured to rotate the shaft member, which is in the linear motion, in the same direction as a rotation direction of the nut member.

2. The electric actuator according to claim 1, wherein
   a protrusion portion protrudes from an outer circumference of the shaft member,
   the guide portion is provided with a guide groove configured to be brought into engagement with the protrusion portion so as to guide the linear motion of the shaft member,
   the guide groove constitutes the rotating mechanism portion, and
   the rotating mechanism portion includes an inclination portion that is inclined with respect to the direction of the axis.

3. The electric actuator according to claim 1, wherein the power transmission member includes a ball configured to roll in the groove as the nut member rotates.

4. The electric actuator according to claim 1, wherein the guide portion is formed as a separate member from a base body that houses the shaft member.

5. The electric actuator according to claim 1, wherein the guide portion has a straight-line portion that configured to cause the shaft member to be in the linear motion without any rotation.

6. A vehicle brake system comprising:
   a hydraulic pressure generator including the electric actuator according to claim 1, wherein
   the hydraulic pressure generator is configured to generate a brake hydraulic pressure by
     driving the electric motor according to an operation amount of a brake controller so as to displace the shaft member, and
     compressing a brake fluid by means of a slave piston that is displaced within a cylinder main body as the shaft member is displaced.

7. The vehicle brake system according to claim 6, wherein a displacement speed of the slave piston relative to a rotating speed of the nut member is changeable.

8. The vehicle brake system according to claim 7, wherein the guide portion is formed
   to rotate the shaft member in an opposite direction to a rotation direction of the nut member when the electric motor is started in such a state that no brake hydraulic pressure is generated in the hydraulic pressure generator, and
   thereafter to rotate the shaft member in the same direction as the rotation direction of the nut member when the shaft member is displaced further.

9. A vehicle brake system comprising:
   a hydraulic pressure generator configured to drive an electric motor according to an operation amount of a brake controller, wherein
   the hydraulic pressure generator includes
     an electric actuator configured to translate rotational motion of a nut member that rotates by means of a rotational driving force of the electric motor, into linear motion of a shaft member, and
     a slave piston that is displaced within a cylinder main body as the shaft member, which is in the linear motion, is displaced so to compress a brake fluid to thereby generate a brake hydraulic pressure, and
   a displacement speed of the slave piston relative to a rotating speed of the nut member is changeable, wherein the electric actuator comprises a guide portion configured to guide linear motion of the shaft member, and wherein the guide portion is formed to rotate the shaft member in an opposite direction to a rotation direction of the nut member when the electric motor is started in such a state that no brake hydraulic pressure is generated in the hydraulic pressure generator and thereafter to rotate the shaft member in the same direction as the rotation direction of the nut member when the shaft member is displaced further.

10. The electric actuator according to claim 1, wherein the guide portion is an end cap fixed to a main body, the end cap is a cylindrical member comprising a bottom surface and an opening portion, wherein the shaft member is housed inside the end cap.

11. The electric actuator according to claim 10, wherein the rotating mechanism portion includes opposing slits formed in a circumferential wall of the end cap so as to penetrate through the end cap, and the slits are brought into engagement with guide pins, which protrude from an outer circumference of the shaft member, the slits guide the movement of the guide pins when the shaft member is displaced.

12. The electric actuator according to claim 11, wherein the slits are divided into a first inclination portion on the opening portion and a second inclination portion on a closed portion and a linear portion between the first inclination portion and the second inclination portion and which is parallel to the axial direction of the shaft member.

13. The electric actuator according to claim 12, wherein the first inclination portion is inclined with respect to the axial direction and the second inclination portion is inclined with respect to the axial direction towards the closed portion, the second inclination portion is formed from a predetermined start point P1 located on the closed portion to a termination point P2 located on the opening portion, the straight-line portion is formed from a start point that is the termination point P2 of the second inclination portion to a termination point P3 that is located on the opening portion of the termination point P2, and the first inclination portion is formed from a start point that is the termination point P3 of the straight-line portion to a termination point P4 that is located at the opening portion.

14. The electric actuator according to claim 13, wherein the termination point P2 of the second inclination portion is located in a position which is obtained by rotating the start point P1 about a center line CL by a predetermined angle, the termination point P4 of the first inclination portion is located in a position obtained by rotating the start point P3 about the center line CL, and a rotation direction from the start point P1 to the termination point P2 of the second inclination portion is opposite to a rotation direction from the start point P3 to the termination point P4 of the first inclination portion.

15. The electric actuator according to claim 14, wherein the second inclination portion is formed so as to rotate the guide pins rightwards about the center line CL as seen from the closed portion when the shaft member is displaced in a forward direction FW, and the first inclination portion is formed so as to rotate the guide pins leftwards as seen from the closed portion when the shaft member is displaced in the forward direction FW.

16. The electric actuator according to claim 15, when the guide pins are guided by the second inclination portion, the shaft member rotates rightwards, and the nut member and the shaft member rotate in opposite directions, when the guide pins are guided by the straight-line portion, the shaft member does not rotate, and when the guide pins are guided by the first inclination portion, the shaft member rotates leftwards, and the nut member and the shaft member rotate in the same direction.

17. The electric actuator according to claim 16, wherein a rotating speed of the nut member is faster than a rotating speed of the shaft member.

18. An electric actuator comprising:

a shaft member on an outer circumference of which a spiral groove is formed;

a nut member that is fitted onto the shaft member;

a power transmission member that is disposed between an inner circumference of the nut member and the groove; and a guide portion configured to guide linear motion of the shaft member, wherein rotation of the nut member about the shaft member by means of a rotational driving force of an electric motor results in the linear motion of the shaft member, the guide portion includes a rotating mechanism portion configured to rotate the shaft member about an axis when the shaft member is in the linear motion, the guide portion is an end cap fixed to a main body, the end cap is a cylindrical member comprising a bottom surface and an opening portion, wherein the shaft member is housed inside the end cap, the rotating mechanism portion includes opposing slits formed in a circumferential wall of the end cap so as to penetrate through the end cap, the slits are brought into engagement with guide pins, which protrude from an outer circumference of the shaft member, the slits guide the movement of the guide pins when the shaft member is displaced, and the slits are divided into a first inclination portion on the opening portion and a second inclination portion on a closed portion and a linear portion between the first inclination portion and the second inclination portion and which is parallel to the axial direction of the shaft member.

* * * * *